(12) United States Patent
Tytgat et al.

(10) Patent No.: US 10,531,081 B2
(45) Date of Patent: Jan. 7, 2020

(54) VIDEO DECODING AND ENCODING SYSTEM

(71) Applicant: Alcatel Lucent, Boulogne Billancourt (FR)

(72) Inventors: Donny Tytgat, Antwerp (BE); Christoph Stevens, Antwerp (BE); Sammy Lievens, Antwerp (BE)

(73) Assignee: Alcatel Lucent, Nozay (FR)

( * ) Notice: Subject to any disclaimer, the term of this patent is extended or adjusted under 35 U.S.C. 154(b) by 25 days.

(21) Appl. No.: 15/549,519

(22) PCT Filed: Feb. 8, 2016

(86) PCT No.: PCT/EP2016/052628
§ 371 (c)(1),
(2) Date: Aug. 8, 2017

(87) PCT Pub. No.: WO2016/128354
PCT Pub. Date: Aug. 18, 2016

(65) Prior Publication Data
US 2018/0027232 A1 Jan. 25, 2018

(30) Foreign Application Priority Data
Feb. 13, 2015 (EP) .................... 15305214

(51) Int. Cl.
*H04N 19/102* (2014.01)
*H04N 19/136* (2014.01)
(Continued)

(52) U.S. Cl.
CPC ......... *H04N 19/102* (2014.11); *H04N 19/136* (2014.11); *H04N 19/146* (2014.11); *H04N 19/164* (2014.11); *H04N 19/63* (2014.11)

(58) Field of Classification Search
CPC .... H04N 19/102; H04N 19/63; H04N 19/395; H04N 19/44; H04N 19/164;
(Continued)

(56) References Cited

U.S. PATENT DOCUMENTS

2005/0135497 A1* 6/2005 Kim .................... H04B 7/0626
375/267
2008/0104652 A1* 5/2008 Swenson ................ H04L 47/10
725/118
(Continued)

FOREIGN PATENT DOCUMENTS

JP 2000-115771 A 4/2000
WO WO 03/005729 A1 1/2003

OTHER PUBLICATIONS

Jingteng Xue et al., Mobile Video Perception: New Insights and Adaptation Strategies, IEEE Journal of Selected Topics in Signal Processing, vol. 8, No. 3, pp. 390-401, XP011547869, 2014.
(Continued)

*Primary Examiner* — Joseph Suh
(74) *Attorney, Agent, or Firm* — Fay Sharpe LLP

(57) ABSTRACT

Video decoder adapted for decoding video based on decoder parameters selected from variable decoder parameters, the decoder comprising an estimator adapted to estimate user viewing experience based on sensor data and comprising a constraint analyzer adapted to analyze constraints when using the decoder parameters, the video decoder further comprising a selector adapted to select said decoder parameters from the variable decoder parameters, wherein the selector is coupled to the estimator and the constraint analyzer.

10 Claims, 2 Drawing Sheets

(51) Int. Cl.
*H04N 19/146* (2014.01)
*H04N 19/164* (2014.01)
*H04N 19/63* (2014.01)

(58) Field of Classification Search
CPC .. H04N 19/156; H04N 19/154; H04N 19/146; H04N 19/136; H04N 19/162
See application file for complete search history.

(56) References Cited

U.S. PATENT DOCUMENTS

| | | | | |
|---|---|---|---|---|
| 2008/0320509 | A1* | 12/2008 | Gustafson | G06Q 30/02 725/23 |
| 2010/0046631 | A1* | 2/2010 | Raveendran | H04N 21/4348 375/240.25 |
| 2011/0095875 | A1* | 4/2011 | Thyssen | G09G 5/10 340/407.1 |
| 2011/0169603 | A1* | 7/2011 | Fithian | G06Q 10/00 340/5.52 |
| 2013/0088644 | A1* | 4/2013 | Atkins | H04N 1/603 348/602 |
| 2013/0217978 | A1 | 8/2013 | Ma | |
| 2013/0251284 | A1* | 9/2013 | Zhang | H04N 19/176 382/261 |
| 2014/0118354 | A1* | 5/2014 | Pais | G09G 5/373 345/428 |
| 2014/0307569 | A1* | 10/2014 | Barbieri | H04L 5/0032 370/252 |
| 2016/0163023 | A1* | 6/2016 | Wey | G06T 3/4053 345/428 |
| 2017/0094297 | A1* | 3/2017 | Gu | H04N 19/65 |
| 2018/0101957 | A1* | 4/2018 | Talathi | G06T 7/10 |
| 2018/0278389 | A1* | 9/2018 | Hamelin | H04L 1/0009 |

OTHER PUBLICATIONS

Limin Liu et al., "Complexity-rate-Distortion Analysis of Backward Channel Aware Wyner-Ziv Video Coding," IEEE International Conference on Imaging Processing, pp. II-25-II-28, XP031157852, 2007.

Javed I. Khan et al., "A Hybrid Scheme for Perceptual Object Window Design with Joint Scene Analysis and Eye-Gaze Tracking for Media Encoding based on Perceptual Attention," Visual Communications and Imaging Processing, pp. 1341-1352, XP030081399, 2004.

International Search Report for PCT/EP2016/052628 dated Mar. 22, 2016.

Vasily G. Moshnyaga, et al., "A New Approach for Energy Management in User-Centric Applications," Green Computing Conference, 2010 Internatinoal, IEEE, Piscataway, New Jersey, USA, Aug. 15, 2010, pp. 107-112, XP031773086.

* cited by examiner

VIDEO DECODING AND ENCODING SYSTEM

TECHNICAL FIELD

The present invention relates to a video decoder, to a video encoder, and to a video system. The invention further relates to a method for decoding video.

BACKGROUND

Video decoding nowadays attempts to recreate the original source as good as possible. This is done under the assumption that the viewing conditions are in line with the expected scenarios envisioned when recording/editing the footage. Common assumptions include an average-lit room with an average-abled viewer at 'normal' distance from an average-sized TV set. While this suits the average usage scenarios, it is not optimal (in terms of compression, user experience, complexity) for many use cases.

The existing solution offers an average-fits-all solution where the content creator assumes the viewing condition, and creates the content to match this assumption.

Modern televisions do offer an—albeit small—adaptation possibility by allowing the user to manually choose a certain viewing profile. This drives a certain image processing profile to enhance the viewing experience in some ways (e.g. a 'movie' profile which attempts to enhance the dynamic range of the content). While this adaptation can be useful, it is restricted to (slightly) enhancing the user experience and needs to be configured manually. Furthermore, this only adapts to a very small part of the viewing context, i.e. the viewing device itself. Additionally, these post processing steps do not take into account any previous coding steps and configuration; thus providing sub-optimal performance.

In the domain of scalable video, other adaptation mechanisms are common. Different layers are available in the codec in order to increase/decrease quality of the video, at the expense of bandwidth. The selection of these layers is configured by the network in order to optimize for bandwidth (and, implicitly for user experience by limiting the number of video freezes). Other systems allow for manual selection of the appropriate layers by the end-users. The network either configures the system based on network usage, or the user needs to configure the codec himself manually.

It is an object of the present invention to provide video to a user in a more optimal manner.

SUMMARY

To this end, the invention provides in a video decoder adapted for decoding video based on decoder parameters selected from variable decoder parameters, the decoder comprising an estimator adapted to estimate user viewing experience based on sensor data and comprising a constraint analyzer adapted to analyze constraints when using the decoder parameters, the video decoder further comprises a selector adapted to select decoder parameters from the variable decoder parameters, wherein the selector is coupled to the estimator and the constraint analyzer.

The invention is based on the insight that users can be in different types of environments wherein the environments affect the user viewing experience in different ways. Examples are described hereunder. By measuring the user viewing experience, directly or indirectly, based on sensor data, decoder parameters can be selected from variable decoders parameters. The video decoder of the invention further analyzes constraints when using decoder parameters. The combination of these elements allows to select optimal decoder parameters from the variable decoder parameters, wherein user viewing experience as well as constraints are taken into account. This allows to select decoder parameters that allow to decode video with smaller effort while limiting user viewing experience degradation.

The invention takes into account potential benefits in terms of compression, complexity or user experience so that a more flexible solution can be offered. Thereby, the invention proposes a solution for an automatic configuration of the codec capabilities based on the end-user context. The invention allows to automatically adapt the available codec parameters based on the end-user context. Viewing conditions can change rapidly (e.g. when viewing content on the go), and the invention allows decoding parameter adaptation to match these conditions.

Preferably, the selector is adapted to select decoder parameters so that user viewing experience and constraints are balanced according to a set of predetermined rules. Thereby, the set of predetermined rules allows to encode preferences and mechanisms to allow optimal decoder parameter selection.

Preferably, the selector is adapted to translate the selected decoder parameters into codec parameters, and wherein the video decoder further comprises a communication module for sending the codec parameters to a video encoder. In this manner, the encoder is also integrated and affected by the selection made at the decoder. As a result, not only decoder related constraints, but also encoder related constraints as well as network transmission constraints such as bandwidth can be taken into account when selecting decoder parameters.

Preferably, the constraints comprise one or multiple of computational requirements, memory footprint, battery use and bandwidth use. These constraints can be analyzed, and a selection of decoder parameters can be made to optimize these constraints in view of the user viewing experience. Thereby, the rules to select the decoder parameters can for example comprise a rule to ensure that when battery is low, decoder parameters are chosen to minimize battery use.

Preferably, the sensor data is adapted to measure environmental parameters and wherein the user viewing experience is estimated based on predetermined correlation between the environmental parameters and the user viewing experience. In this manner, the sensor data is indirectly provided to estimate the user viewing experience. The predetermined correlation can for example be stored in a database that is created based on test and simulation data.

Preferably, the sensor data is adapted to measure user conditions such as heart rate and/or eye gaze, and wherein the user viewing experience is estimated based on predetermined interpretation of the user conditions. Nowadays, sensors are more and more advanced allowing to measure user conditions. In the future, neural sensors can measure neural activities of the user. Sensors like heart rate and eye gaze are already available in the market. Based on these user condition sensors, a user viewing experience can be estimated based on a predetermined interpretation. In this manner, the sensor data can automatically directly measure the impact of a change in decoder parameters to the user viewing experience. This allows to optimize the decoder parameters.

Preferably, the video decoder comprises a testing loop wherein decoder parameters are varied while sensor data is collected so that the change in user viewing experience is observed while varying the decoder parameters. This testing loop is adapted to be executed periodically and allows to measure the impact of decoder parameter variations on the user viewing experience. Particularly, when user conditions change, for example a user gets tired, or when environmental parameters change, the correlation between user viewing experience and change in decoder parameters may change. By periodically running the testing loop, optimal decoder parameters can be selected and decoder parameters can be adapted to changing viewing conditions.

The invention further relates to a video encoder adapted for encoding video based encoded parameters wherein the video encoder comprises a communication module for receiving the codec parameters from a video decoder according to the present invention. The video encoder can encode video in a more optimal manner meaning with a predetermined optimal balance between user viewing experience and constraints.

The invention further relates to a video system comprising a video decoder according to the invention and comprising a video encoder according to the invention, and wherein the video encoder is connected via networking equipment with the video decoder.

The invention further relates to a method for decoding video based on decoder parameters, wherein the method comprises:
  estimating user viewing experience based on sensor data;
  analyzing constraints when using the decoder parameters;
  selecting the decoder parameters from variable decoder parameters, based on the estimating and the analyzing step.

According to this method, decoding parameters can be selected based on user viewing experience and constraints. Advantages and effects are described above in relation to the video decoder.

Preferably, the step of selecting comprises balancer viewing experience and constraints according to a set of predetermined rules. The method preferably further comprises translating the decoder parameters into codec parameters, and sending the codec parameters to a video encoder. Advantages and effects of these features are described above in relation to the video decoder.

The invention further relates to a digital storage medium encoding a machine executable program of instructions to perform the method of the invention. The present invention further relates to a computer program product comprising computer executable instructions for performing, when the program is run on a computer, the method of the invention.

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION OF EMBODIMENTS

A first embodiment of the invention involves coupling the video decoder with a system that enables impact estimation of changing available codec parameters to the viewing experience based on the perceived viewing conditions and the content itself, preferably including meta data. It furthermore allows for optimization of these parameters according to a set of constraints, for example complexity, user experience, bandwidth, viewing distance, . . . . From a high-level point of view, a number of sensors are located at the decoder side and these are used to get an estimate of the viewing context. Viewing context preferably includes one or multiple of light conditions, fatigue of the viewer, eye gaze, noise, etc. Once the context has been estimated, the optimal decoder parameters can be determined taking into account a previously learned impact model, and a given codec model. The impact model describes how the viewing conditions, the codec parameters and optionally the content parameters relate to each other with regards to a perceptual score $\lambda$. The codec model translates codec parameters to a set of performance measures that are relevant to the system such as computational requirements, memory footprint, battery impact and bandwidth. Thereby it is noted that bandwidth is only relevant for a further embodiment wherein the video encoder is also affected, as is described hereunder.

Figure 1:
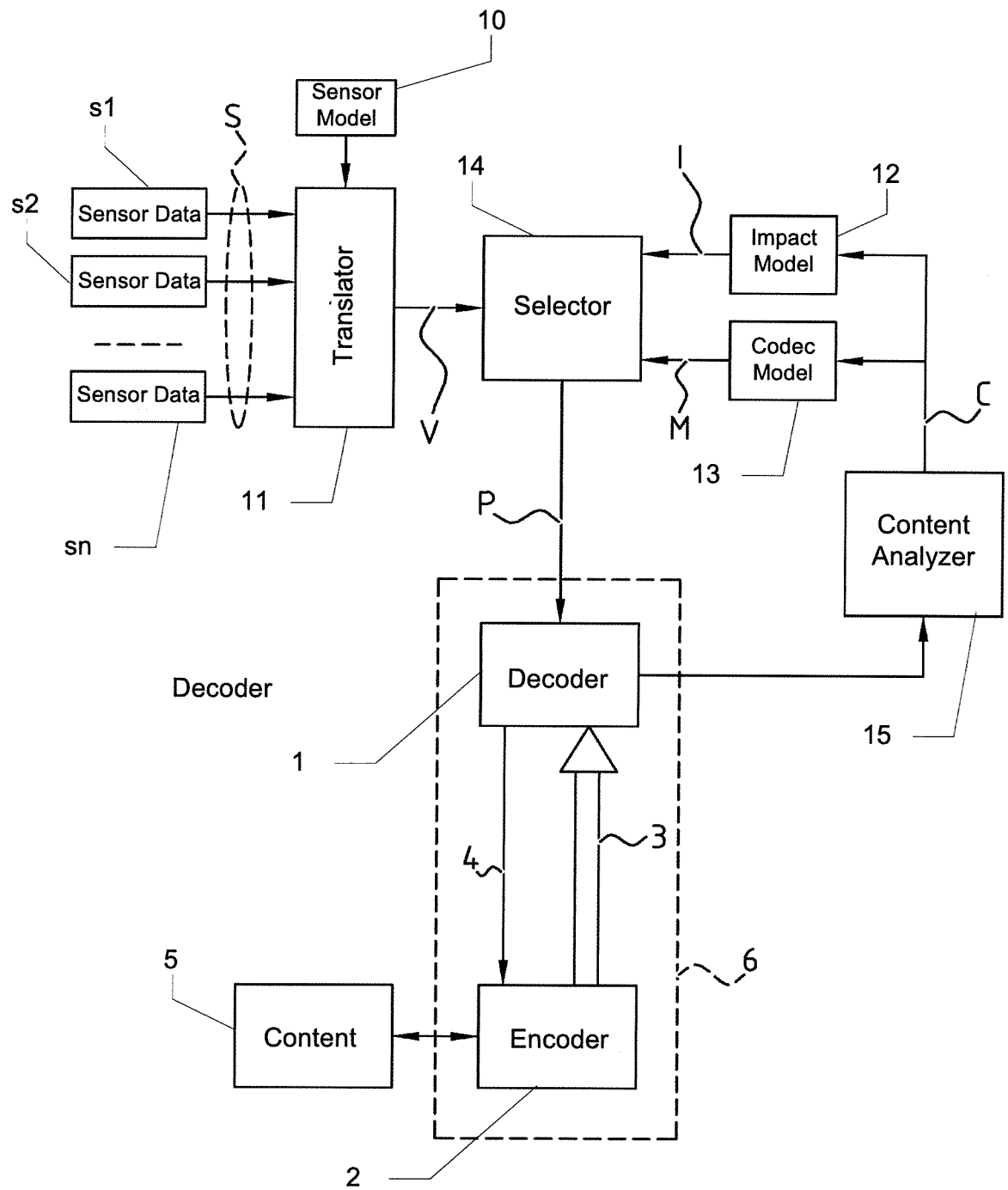
FIG. 1 illustrates an example of an encoder and a decoder according to an embodiment of the present invention.

FIG. 1 illustrates an embodiment of the invention. Raw sensor data S (s1, s2, . . . , sn) is preferably translated by a sensor translator 11 to a sensor-agnostic version V. The sensor-agnostic data V is an abstract version of the raw sensor data S. This translation is preferred because otherwise it would be needed to train new impact models when a new type of sensor comes, or because sensors that essentially measure the same quantity might output a different type of raw information. By doing this step, it is possible to decouple the actual raw sensors from the rest of the system. The sensor model 10 facilitates this; to this end a function Se is created that does: Se(S)=V. This model 10 is updated when a new sensor is to be supported by the system; while the rest of the system is not affected. Based on this sensor-agnostic data, a viewing context is derived. Therefore the viewing context is also assigned with the reference V, since it directly relates to the sensor data V.

An impact model 12 determines the perceptual impact of making changes to the decoder parameters P for a certain viewing context V, and optionally certain content parameters C. The content parameters C depict for example statistics of the scene at time instance t−1 and can comprise various levels of detail. As an example, low-level parameters are things like the average luminance (light/dark), mid-level parameters can encompass things like the average motion in a scene while high-level parameters can contain information on the type of objects in the scene, for example humans, nature, etc. The content parameter C allow for an extra level of adaptation. For action movies for instance, the impact of improving frame quality might be less than for romantic movies due to the temporal obfuscation in fast scenes.

The impact model 12 is represented by the function I. I(V,P,C) returns a perceptual score 2 for a given viewing context V, content parameters C, determined by a content analyzer 15, and decoder parameters P. Note that the vectors V, C and P preferably also comprise differential information at selected time scales e.g. v1 can also have one or more associated $\Delta v1,ts$. This differential information allows for the system to reason not only on absolute values, but also changes in value.

The impact model 12 determines a user experience impact I based on a predetermined set of rules. Thereby the sensor data V is used to compare the user context with predefined user contexts in the predetermined set of rules, to extract a corresponding user experience impact I. Alternatively, the impact model 12 determines a user experience impact I based on the sensor data V itself, wherein user experience is directly or indirectly measured by the sensors. Thereby a predetermined user experience testing loop is at least periodically executed to test user experience impact while changing decoder parameters P. Using such testing loop, the user experience impact I is measurable in real time or at least semi real time. The creation of the impact model 12 is described in more detail hereunder.

The codec model 13, also referred to as constraint analyzer 13, will determine the influence of changing decoder parameters P on the system constraints M. Metrics such as the computational requirements for the decoder, the memory footprint and the battery are examples of such constraints. The codec model 13 is used by the system to determine the non-perceptual impact of changing the decoder parameters. If the battery needs to be saved on a mobile device for instance, the constraints analyzer 13 determines which decoder parameters to change to accommodate this.

The sensor information S along with the impact model 12 and codec model 13 is used by a selector 14 to select optimal decoder parameters P. Taking the example of saving battery life on a mobile device, the selector 14 will consider the viewing conditions based on the sensor data V and determine the decoder parameters P that limits the perceptual quality loss whilst maximizing the battery performance. Taking it a step further, in one example the selector 14 could increase the perceptual quality by emphasizing certain features in viewing conditions that normally do not show these accurately. In case of a mobile tablet for instance that is viewed in very bright sunlight, the system can increase contrast in the edges of objects in the scene, provided that this is part of the decoder parameter set, whilst removing fine grained details.

In one example the decoder 1 operates in a more or less standalone manner, only with a forward link 3 and without a backward link 4 to the encoder 2 and consequently the optimizations are restricted to optimizing complexity and the user experience. Bandwidth, particularly in the forward link 3, cannot be impacted in such example. This scenario is this suited for multicast. A further example, a backward link 4 is provided towards the encoder 2, and the encoder can be impacted, as is discussed next.

The aforementioned example assumed that only the decoder is influenced by the selected parameters. This is a common scenario for current codecs where there is a strictly 1-way communication path between the encoder 2 and the decoder 1. In the future however, it is probable that decoders 1 will be able to communicate with the encoders 2 during the video transmission session 3. This can be done for reasons of improved complexity at the encoder 2 side, by moving complexity to the decoder and/or network, for enhanced content 5 interaction or even improved compression performance. In such scenarios, it is very useful to also signal the encoder 2 with optimal codec parameters for the estimated viewing context and content. That way, the encoder 2 can be controlled in order to not only optimize user experience and complexity, but also bandwidth. In this example the selected optimal parameters do not only impact the decoder 2, but the complete codec 6. Also notice that the arrow 4 leading to the encoder 2 runs through the 'codec' box 6, implying that this information will probably be sent within a channel that is defined by the encoder (in-band). This is not required, however it does reduce potential issues regarding synchronization and network traversal (e.g. firewalls).

Note that, in the presented form, the example is not optimized for multicast because one receiver/decoder 1 needs specific adaptation from the encoder 2. While this is not necessarily an issue since video consumption seems to gradually move away from broadcast to unicast, there is still a possibility to create a 'hybrid-cast' system where the 'optimal' codec parameters are aggregated over multiple users/decoders 1, in which the user group is expected to have similar context, in the cloud, and only a specific encoder 2 is needed per group of users.

Furthermore, a multi-stage encoder 2 can be employed where the generic operations are first done in a pre-processing step, and the operations that can be personalized are done in the actual encoding step. When mapping this on FIG. 1, the content store 5 would actually contain pre-processed streams, and the encoder 2 uses this pre-processed information to make the final coding and adaptation steps. This way, not a full encoder is needed per user/user group.

An example of the impact model 12 is described in more detail. This impact model 12 is not a straightforward model however as it determines what the impact is on the viewer experience for a certain viewing context V, codec parameter set P and content type C. As such, this impact model 12 is constructed in some manner. In one example, this is done manually, employing heuristics taken from relevant studies. In another example, a mechanism is implemented make the impact model 12 self learning, for example by supplying it with the various degrees of freedom, and employing a system that can measure the user experience for each parameter set instance.

In a first example of the impact model 12, wherein the impact is determined manually, the viewing context V is simulated, and the content store 5 is selected in order to provide a representative content set. A module called "Determine impact" (not shown) is added to communicate with the impact model 12, which added module is responsible for measuring or receiving from a user the impact that a certain parameter delta has to the user experience.

The user experience is thereby entered into the impact model 12 manually, preferably using a representative test public who are shown these clips with different parameter sets, and an apparatus for these observers to indicate whether the experience is improved or reduced. This impact can then be combined with the potential impact on complexity and bandwidth, and is placed into the impact model 12.

In another embodiment of the impact model 12, a live rating system is implemented. In such live rating system, certain physiological responses are measured via the sensors S, and used for estimating the impact of certain parameter sets on the user experience. With the advances in wearable devices for example, it becomes possible to monitor neural activity in a live manner, and as such determine when the observer loses attention for instance. It is thus probable that the impact model 12 can be further automated in the nearby future, creating a system which learns from the user and his/her habits in order to optimize the codec.

Figure 2:
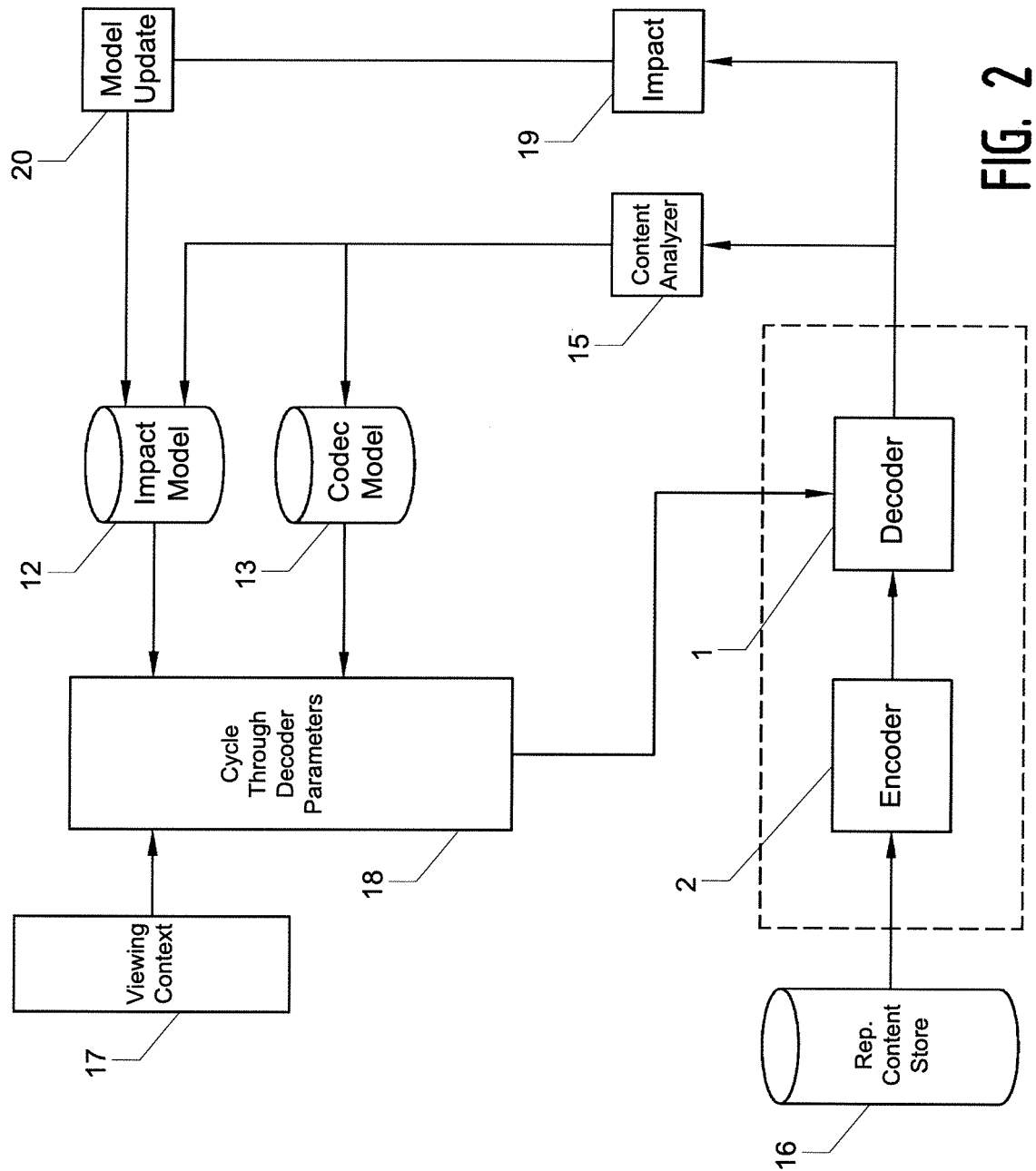
FIG. 2 illustrates an example of an encoder and a decoder according to an embodiment of the present invention with an automated impact model.

An example of an impact model 12 is shown in FIG. 2. FIG. 2 shows elements that are described above and additionally shows a representative content store 16 that serves as input for the encoder 2. It shows in block 17 how a viewing context is emulated, and used as input for block 18 being cycling through decoder parameters. Furthermore, in block 19, impact is determined and in block 20, the impact model update is generated. Via such mechanism, the impact model 12 can be updated.

This invention enables rigorous adaptation of the codec based on context properties at the consumer side. The context is estimated, along with the impact of these context changes, and this is used to drive the codec properties in order to optimize the viewing experience, the bandwidth and/or the complexity.

The invention allows for many optimizations that were previously not possible. Adaptation according to light conditions, attention span, gaze, saliency, etc. is possible through this system. This in turn allows for the system to adapt to the user, rather than the user having to adapt to the system, thus providing an important advance in the way video data is consumed.

Existing solutions do not automatically adapt the codec parameters according to the viewer's context. This invention allows such automated codec adaptation, enabling a multitude of usage scenarios which can optimize the video delivery system, be it for user experience, bandwidth use or complexity.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus comprising:
   at least one processor; and
   at least one memory including computer program code;
   the at least one memory and the computer program code configured to, with the at least one processor, cause the apparatus at least to perform:
   decoding video based on decoder parameters selected from variable decoder parameters;
   estimating a user viewing experience based on acquired sensor data generated from an output of one or more sensors that are configured to measure one or more user conditions;
   analyzing constraints when using the decoder parameters; and
   selecting said decoder parameters from the variable decoder parameters;
   wherein the selecting is performed in accordance with the estimating and analyzing so that the user viewing experience and constraints are balanced according to a set of predetermined rules.

2. The apparatus according to claim 1, wherein the at least one memory and the computer program code are further configured to, with the at least one processor, cause the apparatus to at least further perform:
   translating the selected decoder parameters into codec parameters; and
   sending the codec parameters to an encoding apparatus.

3. The apparatus according to claim 1, wherein the constraints comprise one or multiple of computational requirements, memory footprint, battery use and bandwidth use.

4. The apparatus according to claim 1, wherein the sensor data is adapted to measure environmental parameters and wherein the user viewing experience is estimated based on predetermined correlation between the environmental parameters and the user viewing experience.

5. The apparatus according to claim 1, wherein the sensor data is adapted to measure user conditions including at least one of heart rate and eye gaze, and wherein the user viewing experience is estimated based on predetermined interpretation of the user conditions.

6. The apparatus according to claim 5, wherein the at least one memory and the computer program code are further configured to, with the at least one processor, cause the apparatus to at least further perform:
   varying decoder parameters while sensor data are collected so that a change in the user viewing experience is observed while varying the decoder parameters.

7. An encoding apparatus comprising at least one processor; and
   at least one memory including computer program code;
   the at least one memory and the computer program code configured to, with the at least one processor, cause the encoding apparatus at least to perform:
   encoding video based on codec parameters received from an apparatus according to claim 1.

8. A method for decoding video based on decoder parameters, wherein the method comprises:
- estimating a user viewing experience based on sensor data, wherein said sensor data is generated from an output of one or more sensors configured to measure one or more user conditions;
- analyzing constraints when using the decoder parameters;
- selecting said decoder parameters from variable decoder parameters based on said estimating and said analyzing,
- wherein said selecting comprises balancing user viewing experience and constraints according to a set of predetermined rules.

9. The method according to claim 8, wherein the method further comprises translating said decoder parameters into codec parameters and sending said codec parameters to an encoding apparatus.

10. A non-transitory computer readable storage medium comprising instructions, which, when executed cause a data processing apparatus to perform the following:
- estimating a user viewing experience based on sensor data generated from an output of one or more sensors that are configured to measure one or more user conditions;
- analyzing constraints using variable decoder parameters; and
- selecting a set of decoder parameters from the variable decoder parameters based on said estimate and said analysis;
- wherein said selecting comprises balancing the user viewing experience and constraints according to a set of predetermined rules.

* * * * *